(12) United States Patent
Osawa

(10) Patent No.: US 8,597,039 B2
(45) Date of Patent: Dec. 3, 2013

(54) VEHICLE-SIDE CONNECTOR WITH WATER DRAINAGE PATHS EXTENDING FROM AN OUTWARDLY OPEN RECESS

(75) Inventor: Kiyoshi Osawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/422,407

(22) Filed: Mar. 16, 2012

(65) Prior Publication Data

US 2012/0258617 A1    Oct. 11, 2012

(30) Foreign Application Priority Data

Apr. 5, 2011    (JP) ................... 2011-083479

(51) Int. Cl.
*H01R 4/60*    (2006.01)
(52) U.S. Cl.
USPC ........................................ 439/205

(58) Field of Classification Search
USPC .......................... 439/205, 587, 345, 352–353
See application file for complete search history.

(56) References Cited

U.S. PATENT DOCUMENTS

| 4,793,819 A | 12/1988 | Berg |
| 5,800,188 A | 9/1998 | Barber et al. |
| 5,816,643 A | 10/1998 | Itou et al. |
| 2008/0268706 A1* | 10/2008 | Sheng ........................ 439/587 |

* cited by examiner

*Primary Examiner* — Chandrika Prasad
(74) *Attorney, Agent, or Firm* — Gerald E. Hespos; Michael J. Porco; Matthew T. Hespos

(57) ABSTRACT

A vehicle-side connector (10) to be connected to a charging connector in charging a battery of a vehicle includes a receptacle (33) which is connectable to the charging connector, a mounting portion (31) which is provided to partition between the receptacle (33) and a vehicle (B) and to be fixed to the vehicle, a recess (40) which is open upward and provided on the top of the connecting portion (33), and water drainage paths (41) formed in inner surfaces of the recess (40) without penetrating through the mounting portion (31).

10 Claims, 5 Drawing Sheets

FRONT ← → BACK

VEHICLE-SIDE CONNECTOR WITH WATER DRAINAGE PATHS EXTENDING FROM AN OUTWARDLY OPEN RECESS

BACKGROUND OF THE INVENTION

1. Field of the Invention

The invention relates to a vehicle-side connector to be connected to a charging connector during charging.

2. Description of the Related Art

U.S. Pat. No. 5,816,643 discloses a vehicle-side connector in a housing chamber on an outer surface of a vehicle. A drainage path is provided in the housing chamber for draining rainwater that may have entered the housing chamber and moisture adhering to the wall surface of the housing chamber.

A vehicle-side connector of this type includes a connecting portion that is connectable to a charging connector and a mounting piece on a vehicle-side end of the connecting portion and fixed to a vehicle. The connecting portion is provided with an engaging portion for engaging a lock on the charging connector in a connecting direction. The engaging portion may be arranged between two protection walls extending from the mounting piece to provide protection from external interference.

Water in the housing chamber can be drained from the drainage path if the lock is arranged on the top of the connecting portion, but water stays in the inner space of a recess enclosed by the mounting piece, the protection walls and the lock if it rains or snows with the charging connector locked to the vehicle-side connector. Further, pooled water may freeze if temperature drops with a lock claw immersed in water in the recess and it may be difficult to disengage the lock and the lock claw. Studies are considering a water drainage hole that penetrates through the mounting piece toward the vehicle to bring water pooled in the recess into the vehicle interior and then to drain the water outside. However, measures must be taken to ensure that water brought into the vehicle interior through the water drainage hole does not leak in the vehicle interior and to secure a discharge path for discharging water from the vehicle interior to the outside.

The invention was completed in view of the above situation and an object thereof is to properly improve operability of a vehicle-side connector.

SUMMARY OF THE INVENTION

The invention relates to a vehicle-side connector to be connected to a charging connector for charging a battery of a vehicle. The vehicle-side connector includes a connecting portion that is connectable to the charging connector. A mounting portion is fixed to the vehicle and defines a partition between the connecting portion and the vehicle. A recess is provided on the connecting portion and opens out and at least one water drainage path is formed in an inner surface of the recess without penetrating through the mounting portion.

The recess preferably is open up and is on or near the top of the connecting portion.

Water that may have flowed into the recess, for example, due to showering rain can be discharged to the outside through the water drainage path. Thus, water is less likely to pool in the recess. Further, the water drainage path does not penetrate through the mounting portion. As a result, water can be discharged from the recess to the outside without being brought into the vehicle interior. Hence, there is no need to take measures against water leakage in the vehicle interior and secure a discharge path.

A plurality of water drainage paths may be provided. Therefore, water that has flowed into the recess can be discharged quickly to the outside.

Two side walls may be formed on the top of the connecting portion and may cross a surface of the mounting portion substantially facing the connecting portion. Surfaces of the side walls facing each other may be inner surfaces of the recess. The water drainage paths may be formed at ends of the side walls substantially facing the mounting portion.

The vehicle-side connector is mounted on the vehicle in a somewhat upward facing posture. Thus, water that flows into the recess is collected at a side of the recess facing the mounting portion. Accordingly, the water that has flowed into the recess can be discharge quickly to the outside in two directions without being pooled in the recess.

An engaging portion may project from the upper or outer surface of the connecting portion between the side walls and may be engageable with a lock on the charging connector in a connecting direction.

The bottom surface of the recess may be at a position to contact the lock when the lock and the engaging portion are engaged. At least one recessed groove may be formed near the water drainage paths and near an end of the recess facing the mounting portion. The groove is slightly lower than the bottom surface of the recess.

The vehicle-side connector is mounted on the vehicle in a somewhat upward facing posture. The spacing between the mounting portion and the engaging portion can be made longer to suppress the contact of water with the lock and the engaging portion. However, such a configuration makes the length of the connecting portion longer in the connecting direction and enlarges the vehicle-side connector in the connecting direction. However, water that has flowed into the recess of the subject invention can flow to the recessed groove even if the length of the connecting portion in the connecting direction is short. Thus, the contact of water with the lock and the engaging portion can be suppressed. In this way, water is not likely to freeze in the recess and ice is not likely impede the ability disengage the lock and the engaging portion particularly as compared to the case with no recessed groove is formed.

At least one side wall may be formed on the connecting portion and may cross a surface of the mounting portion substantially facing the connecting portion.

The drainage path preferably is defined by a front surface of the mounting portion, a rear end surface of the protection wall and an outer surface of the receptacle.

The water drainage path preferably is formed over substantially the entire height of the protection wall.

A depth of the recess may be set to substantially equal a projecting distance of the engaging portion from the distal end of the receptacle, and a bottom surface of the recess may be at a position so that a distal end of a tip of a lock provided on the charging connector contacts the bottom surface of the recess.

At least one positioning recess preferably is provided at a position on the connecting portion substantially opposite the recess and/or of the engaging portion and projects radially outward.

These and other objects, features and advantages of the present invention will become more apparent upon reading of the following detailed description of preferred embodiments and accompanying drawings.

DETAILED DESCRIPTION OF THE PREFERRED EMBODIMENTS

Figure 1:
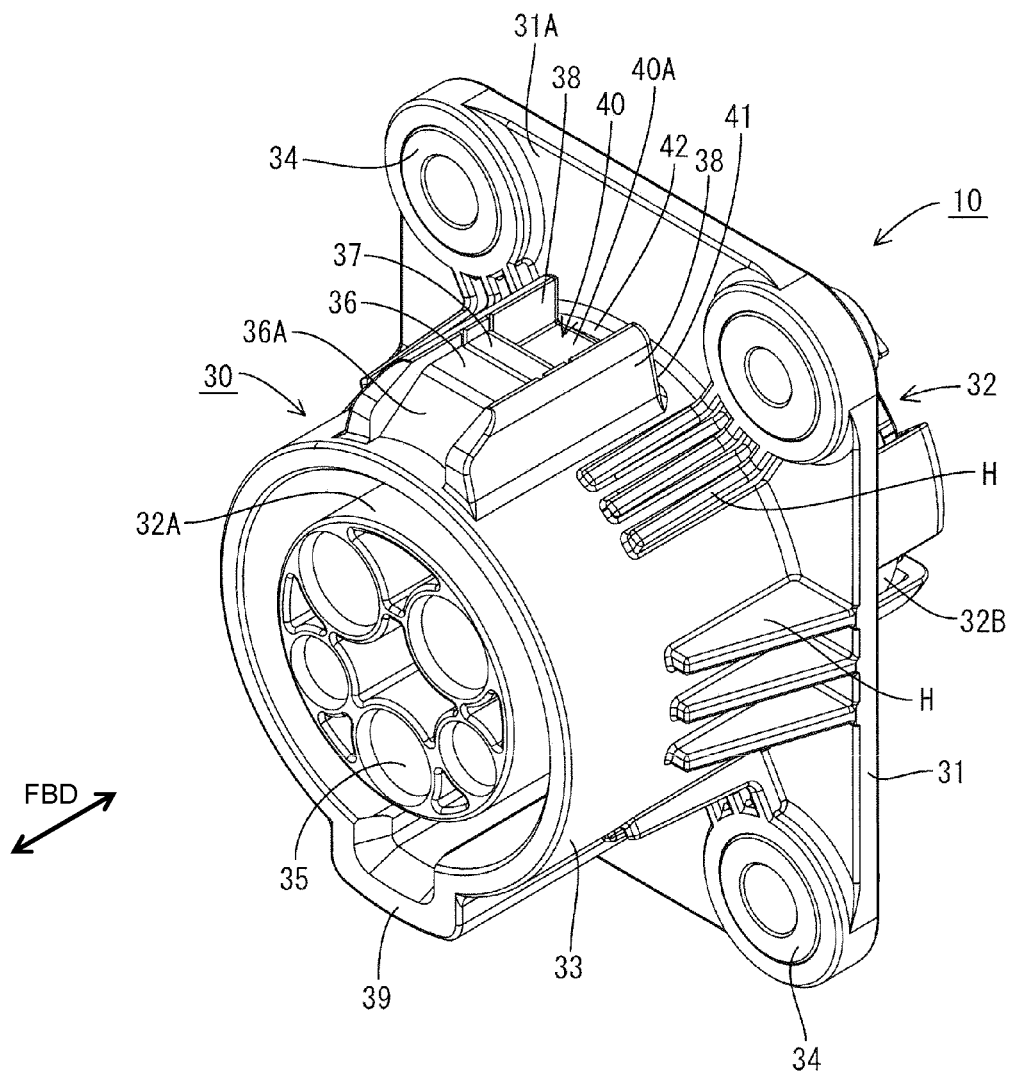
FIG. 1 is a perspective view of a vehicle-side connector.
Figure 2:
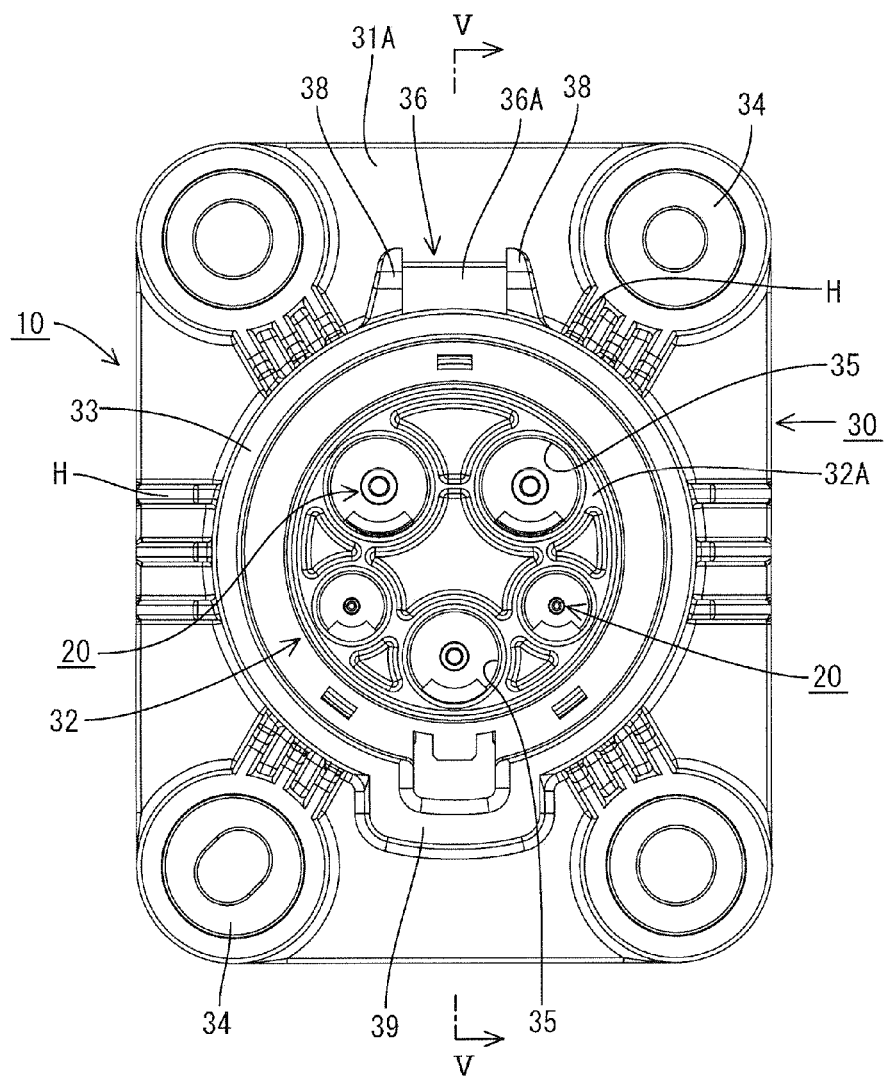
FIG. 2 is a front view of the vehicle-side connector.

As shown in FIGS. 1 and 2, a vehicle-side connector 10 of this embodiment includes vehicle-side terminal fittings 20 and a housing 30 made e.g. of synthetic resin. This vehicle-side connector 10 is to be fixed to a vehicle B and an unillustrated charging connector is connectable to the housing 30 from the front.

Figure 5:
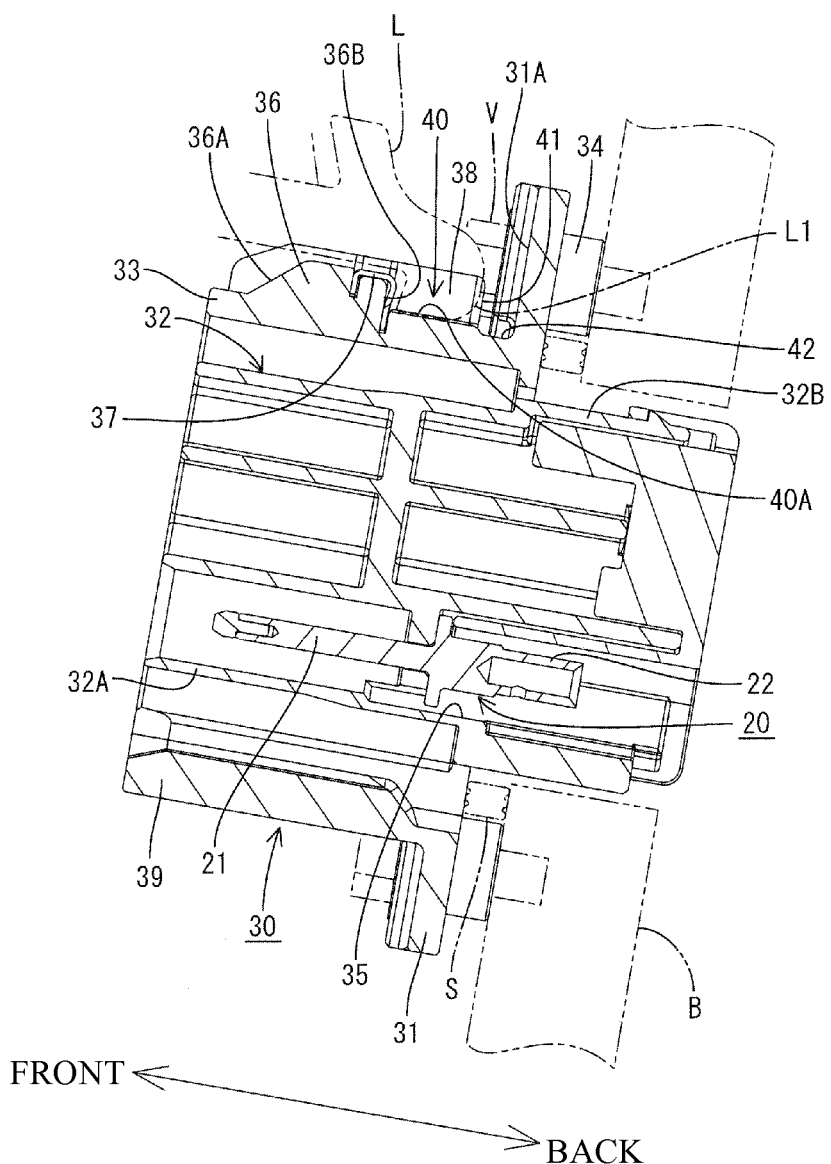
FIG. 5 is a section along V-V of FIG. 2.

As shown in FIG. 5, each vehicle-side terminal fitting 20 includes a terminal connecting portion 21 in the form of a round pin and a wire connecting portion 22 to be connected to an unillustrated wire. The terminal connecting portion 21 is to be connected electrically conductively to a charging-side terminal fitting in the charging connector when the charging connector is connected to the housing 30.

The housing 30 includes a mounting flange 31 in the form of a substantially rectangular or polygonal flat plate, a substantially tubular terminal accommodating portion 32 penetrating through the mounting flange 31 in forward and backward directions FBD, and a substantially tubular connecting portion or receptacle 33 provided around the terminal accommodating portion 32.

As shown in FIGS. 1 and 5, collars 34 are press-fit at four corners of the mounting flange 31, and the housing 30 is fixed to the vehicle by inserting fixing bolts V into the collars 34 and tightening them into the vehicle B. A substantially annular surface seal S is mounted on an outer peripheral edge of the terminal accommodating portion 32 between the vehicle B and the rear surface of the mounting flange 31, as shown in FIG. 5. The seal S is brought into close contact with the vehicle B and the rear surface of the mounting flange 31 to prevent fluid or water from entering the terminal accommodating portion 32 through a clearance between the vehicle B and the mounting portion 31.

The terminal accommodating portion 32 includes a forward projecting portion 32A that projects forward from the mounting flange 31 and a backward projecting portion 32B that projects back from the mounting flange 31. Cavities 35 penetrate through the terminal accommodating portion 32 in forward and backward directions FBD, and the vehicle-side terminal fittings 20 are held in the respective cavities 35.

As shown in FIGS. 1 and 5, the receptacle 33 is arranged around the forward projecting portion 32A of the terminal accommodating portion 32 and extends from a front surface 31A of the mounting flange 31 toward the front end of the forward projecting portion 32A. Thus, the mounting flange 31 defines a partition between the receptacle 33 and the vehicle B. The unillustrated charging connector can fit to the receptacle 33, and a charging-side receptacle of the charging connector can fit in a space between the receptacle 33 and the forward projecting portion 32A as the charging connector is fit to the receptacle 33.

As shown in FIGS. 1 and 2, at least one block-shaped engaging portion or lock 36 projects up or out from the top of the receptacle 33 and is long in forward and backward directions FBD. As shown in FIG. 5, the lock 36 has an inclined surface 36A directed away from the receptacle 33 toward the back and extends back from the rear end of this inclined surface 36A and then extends substantially perpendicularly toward the outer surface of the receptacle 33.

The lock 36 includes a locking surface 36B extending toward the outer surface of the receptacle 33 and a metal locking piece 37 is mounted on the locking surface 36B to cover a rear part of the lock projection 36. A preferably metal lock claw L on the charging connector is pushed up or away from the receptacle 33 by the inclined surface 36A when the receptacle 33 is fit to the charging-side receptacle. The lock claw L and the locking piece 37 of the lock projection 36 then engage in forward and backward directions FBD to hold the receptacle 33 and the charging-side receptacle in a properly fitted state.

Two side protection walls 38, 38 stand up from the upper part of the receptacle 33 adjacent to the lock 36 and face each other on opposite left and right sides of the lock 36, as shown in FIGS. 1 and 2. The protection walls 38, 38 extend back from a position before the lock 36 toward the mounting flange 31 to protect the lock 36 from external interference in a lateral direction.

When the lock claw L and the locking piece 37 of the lock 36 are engaged in forward and backward directions FBD, a tip L1 of the lock claw L is accommodated in a recess 40 enclosed at four sides by the front surface 31A of the mounting flange 31, the locking surface 36B of the lock 36 (locking piece 37), and the opposed inner surfaces of the protection walls 38, 38.

Figure 3:
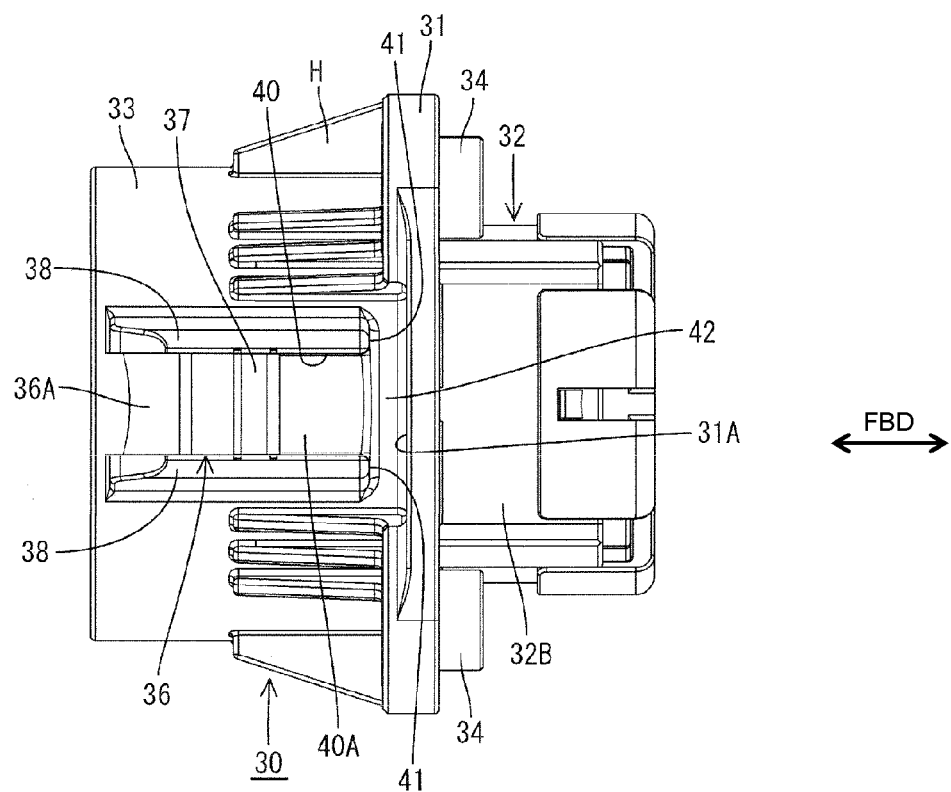
FIG. 3 is a plan view of the vehicle-side connector.

The recess 40 is open radially out and up, as shown in FIGS. 3 and 5, and has a substantially rectangular plan view. Thus, the recess 40 is recessed radially in and down. The depth of the recess 40 is substantially equal to a projecting distance of the lock 36 from the upper end of the receptacle 33, and a bottom surface 40A of the recess 40 is at a position so that the lower end of the tip L1 of the lock claw L substantially contacts the bottom surface 40A as shown in FIG. 5.

A radially aligned positioning recess 39 is provided in a lower part of the receptacle 33. The positioning recess 39 guides the charging-side receptacle to a proper fitted position by guiding an unillustrated positioning rib on the charging-side receptacle of the charging connector therein when connecting the charging connector.

Figure 4:
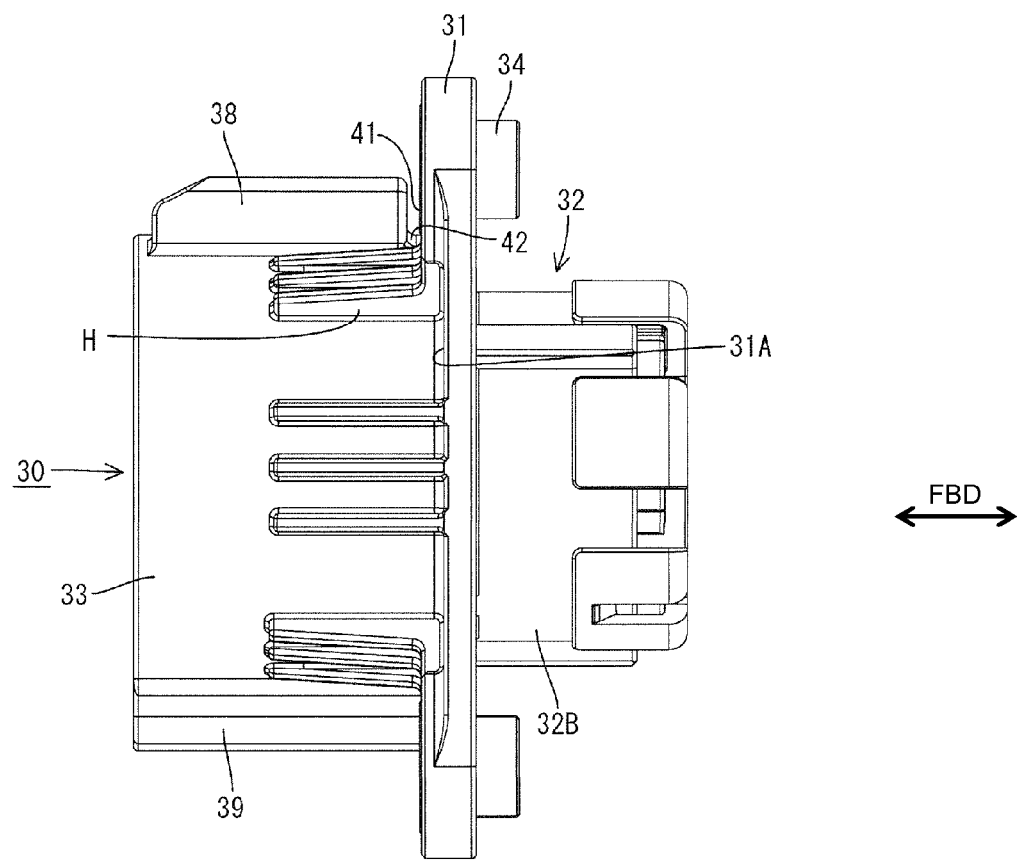
FIG. 4 is a side view of the vehicle-side connector.

As shown in FIGS. 1 and 4, water drainage path 41 are formed at an end of each of protection wall 38, 38 substantially facing the mounting flange 31. The water drainage paths 41, 41 are open up, outward and laterally. Each water drainage path 41 is defined by the front surface 31A of the mounting flange 31, the rear end surface of the protection wall 38 and the outer surface of the receptacle 33, and extends over substantially the entire height of the protection wall 38. Thus, the protection walls 38, 38 and the mounting flange 31 that form the recess 40 are positioned across the water drainage paths 41 from each other.

As shown in FIG. 5, a recessed groove 42 is formed at the water drainage paths 41 and at an end of the recess 40 adjacent the mounting flange 31. The recessed groove 42 is slightly lower than the bottom surface 40A of the recess 40. Further, the recessed groove 42 extends substantially straight between the water drainage paths 41, 41, and is arranged to be at a position behind the tip L1 of the lock claw L and before the front surface 31A of the mounting flange 31 when the lock claw L and the locking piece 37 of the lock 36 are engaged in forward and backward directions FBD.

On the other hand, the rear end surfaces of the protection walls 38, 38 are arranged at positions to be substantially flush with the tip of the lock claw L when the lock claw L and the locking piece 37 of the lock projection 36 are engaged in forward and backward directions FBD. Thus, the lock claw L engaged with the lock projection 36 is protected from external interference in the lateral direction by the protection walls 38, 38.

As shown in FIG. 5, the vehicle-side connector 10 is to be fixed to the vehicle B in an upward facing posture so that the receptacle 33 and the forward projecting portion 32A face somewhat up. The charging connector is connected from the front and charging is performed with the vehicle-side connector 10 and the charging connector locked together by the lock projection 36 and the lock claw L.

Rain or snow during this charging could result in water adhering to the lock projection 36 and the inner surfaces of the protection walls 38. This water may flow into the recess 40 along the lock projection 36 and the protection walls 38. However, any water that has flowed into the recess 40 can be discharged quickly to the outside through the water drainage paths 41, 41 at the ends of the protection walls 38, 38. Thus, water is not likely to stay in the recess 40.

The vehicle-side connector 10 is to be mounted on the vehicle in a somewhat upward facing posture. Thus, any water that has flowed into the recess 40 is collected at the rear near the mounting flange 31. However, the water drainage paths 41 are provided at the ends of the protection walls 38 facing the mounting flange 31. Thus, any water that has flowed into the recess 40 can be discharged without any left in the recess 40, for example, as compared with the case where water drainage paths are formed in central parts of the protection walls 38 in forward and backward directions.

Thought has been given to providing a water drainage hole through the mounting flange 31 of a vehicle-side connector 10 that is mounted on the vehicle in a somewhat upward facing posture. Thus, any water that enters the recess 40 would be brought into the vehicle interior and then discharged to the outside. However, this approach would require an extra measure against water leakage in the vehicle interior and would require a secure path for discharging water from the vehicle interior to the outside. However, the invention enables water in the recess 40 to be discharged without being brought into the vehicle interior. Therefore, there is no need to take measures against water leakage in the vehicle interior and no need to secure the discharge path.

A little water may remain on the bottom surface 40A of the recess 40 even though the water drainage paths 41 are provided in the recess 40. The lock 36 and the lock claw L are in contact with any water that may remain in the recess 40. The lock projection 36 and the lock claw L may be frozen if air temperature drops below freezing in this state and it may become difficult to release the locked state. Water in the recess 40 will not contact the lock 36 and the lock claw L if the spacing between the mounting flange 31 and the lock 36 in forward and backward directions FBD is made longer. However, the elongation of the spacing between the mounting flange 31 and the lock 36 in forward and backward directions FBD leads to the elongation of the receptacle 33 in forward and backward directions FBD, which results in the enlargement of the vehicle-side connector 10 in forward and backward directions.

However, the connector of the invention has the recessed groove 42 formed between the water drainage paths 41 and at the end of the recess 40 adjacent the mounting flange 31. The recessed groove 42 is slightly lower than the bottom surface 40A of the recess 40. Thus, even if the length of the receptacle 33 in forward and backward directions FBD is made shorter, any water remaining in the recess 40 can flow into the recessed groove 42. Further, the recessed groove 42 is behind the lock claw L engaged with the lock 36. Therefore, the lock claw L does not touch the water that has flowed into the recessed groove 42. In this way, as compared with the case where the recessed groove 42 is not formed, it is possible to suppress the contact of water with the lock 36 and the lock claw L and suppress a situation where water in the recess 40 is frozen to make it difficult to disengage the lock 36 and the lock claw L.

The invention is not limited to the above described embodiment. For example, the following embodiments also are included in the scope of the invention.

The inner surfaces of the recess 40 are formed partly by the opposed surfaces of the protection walls 38, 38 and the rear surface of the lock 36 in the above embodiment. However, the invention is not limited to such a mode. For example, the inner surfaces of the recess 40 may be formed partly by side surfaces of reinforcing walls H or the like provided from the mounting flange 31 to the receptacle 33.

The water drainage paths 41 are provided at the ends of the protection walls 38 in the above embodiment. However, water drainage paths may be provided at intermediate positions of the protection walls 38 in forward and backward directions FBD.

One water drainage path 41 is provided at each protection wall 38 in the above embodiment. However, the water drainage path may be formed only at one protection wall 38 or a plurality of water drainage paths may be provided at each protection wall 38.

The water drainage paths 41 are provided at the both protection walls 38 in the above embodiment. However, water drainage paths may be provided at the receptacle 33 or the lock 36.

The recess 40 is on the top of the receptacle 33 in the above embodiment. However, a recess may be on the top of the terminal accommodating portion 32 including no receptacle 33.

Although the receptacle 33 has a cylindrical shape in the above embodiment, the present invention is not limited to such a mode and may be applied, for example, to a receptacle in the form of a rectangular tube.

What is claimed is:

1. A vehicle-side connector to be connected to a charging connector when charging a battery of a vehicle, comprising:
   a tubular connecting portion having a front end for receiving the charging connector, a rear end opposite the front end and an outer peripheral surface extending rearward from the front end, the connecting portion being sloped so that the front end is higher than the rear end;
   a mounting flange projecting out from the outer peripheral surface of the connecting portion rearward of the front end;
   an engaging portion projecting out from a top side of the outer peripheral surface of the connecting portion and spaced forward of the mounting flange;
   side walls extending toward the mounting flange from opposite sides of the engaging portion so that an outwardly open recess is defined by the side walls, the engaging portion and the mounting flange, the side walls being spaced from the mounting flange to define water drainage paths from the recess.

2. The vehicle-side connector of claim 1, wherein the recess is open upward and is on or near the top of the connecting portion.

3. The vehicle-side connector of claim 1, wherein surfaces of the side walls facing each other define inner surfaces of the recess.

4. The vehicle-side connector of claim 1, wherein the connecting portion (33) is engageable with a lock (L) on the charging connector in a connecting direction.

5. The vehicle-side connector of claim 4, wherein a bottom surface of the recess is arranged at a position to contact the lock when the lock and the engaging portion are engaged; and at least one recessed groove lower than the bottom surface of the recess is formed between the water drainage paths and an end of the recess adjacent the mounting flange.

6. The vehicle-side connector of claim 1, wherein the water drainage path is defined by a front surface of the mounting flange, a rear end surface of the protection wall and an outer surface of the receptacle.

7. The vehicle-side connector of claim 6, wherein the water drainage path is formed over substantially the entire height of the protection wall.

8. The vehicle-side connector of claim 1, wherein a depth of the recess is substantially equal to a projecting distance of the engaging portion from a distal end of the receptacle, and wherein a bottom surface of the recess is at a position so that a distal end of a tip of a lock provided on the charging connector substantially comes into contact therewith.

9. The vehicle-side connector of claim 1, further comprising at least one positioning recess projecting radially outward is provided at the connecting portion in a position substantially opposite to that of the recess and the engaging portion.

10. The vehicle-side connector of claim 1, further comprising a recessed groove in the outer peripheral surface of the connecting portion and extending between the water drainage paths.

* * * * *